United States Patent [19]

Hopf et al.

[11] Patent Number: 4,991,869
[45] Date of Patent: Feb. 12, 1991

[54] COVER ASSEMBLY FOR OCCUPANT RESTRAINT SYSTEM

[75] Inventors: Philip W. Hopf; Robert L. Jones, both of Centerville; Eric D. Carlson, Dayton, all of Ohio

[73] Assignee: General Motors Corporation, Detroit, Mich.

[21] Appl. No.: 416,181

[22] Filed: Oct. 2, 1989

[51] Int. Cl.⁵ .............................................. B60R 21/20
[52] U.S. Cl. .................................................... 280/731
[58] Field of Search ...................... 280/731, 732, 743; 74/558.5

[56] References Cited

U.S. PATENT DOCUMENTS

| | | | |
|---|---|---|---|
| 4,325,568 | 4/1982 | Clark et al. | 280/731 |
| 4,334,699 | 6/1982 | Patzelt et al. | 280/731 |
| 4,785,114 | 11/1988 | Fosnaugh et al. | 280/731 |
| 4,878,689 | 11/1989 | Mitzkus et al. | 280/731 |
| 4,903,986 | 2/1990 | Cok et al. | 280/731 |

Primary Examiner—Richard A. Bertsch
Attorney, Agent, or Firm—Herbert Furman

[57] ABSTRACT

A cover assembly for an occupant restraint system is formed of relatively irrupturable material and includes longitudinal and lateral portions which overlie like portions of a container housing an inflatable occupant restraint cushion. The juxtaposed edges of these portions are arranged which are juxtaposed to each other across a tear line of the container. One edge of each pair terminates in a U shaped return bent flange and the other edge of each pair terminates in an S shaped return bent flange having a flap which extends across the tear line and abuts the U shaped flange.

6 Claims, 1 Drawing Sheet

COVER ASSEMBLY FOR OCCUPANT RESTRAINT SYSTEM

This invention relates generally to cover assemblies for occupant restraint systems and more particularly to a decorative outer cover assembly of relatively irrupturable material for an occupant restraint system.

Dunford et al. 3,819,205 and Clark et al. 4,325,568, both assigned to the assignee of this invention, show modular occupant restraint systems which include a support plate mounting an inflator, an inflatable cushion surrounding the inflator and secured to the support plate, a box like container housing the cushion and inflator and having its side walls terminating in flanges secured to the lower side of the support plate adjacent the edges thereof, and an outer decorative cover of flexible rupturable material covering the container and having its side walls terminating in flanges secured to the lower side of the support plate adjacent the edges thereof. The base or upper wall of the container is provided with an integral tear pattern, typically shaped like an "H" or an "I", which ruptures to subdivide the upper wall into severable sections which open outwardly and oppositely of each other upon inflation of the cushion by the inflator. The base or upper wall of the cover is provided with a score line generally aligned with the tear pattern of the container so as to rupture along this line into severable sections coextensive with those of the container when the cushion is inflated and the container ruptures.

Since the outer decorative cover must rupture along the score line, only certain rupturable materials, such as vinyl plastics, can be used for this cover. Other materials which are relatively irrupturable, such as leather, cannot be used since the cover would block or hinder inflation of the cushion.

This invention provides an outer decorative cover assembly which can be formed of relatively irrupturable material and yet permit inflation of an occupant restraint cushion therethrough.

In the preferred embodiment, the cover assembly includes a cover having first and second longitudinal portions covering the longitudinal side walls and the severable sections of the upper wall of the container. The longitudinal edge of one cover longitudinal portion terminates in a U shaped return bent terminal flange located adjacent one side of the longitudinal leg of the tear pattern in the upper wall of the container. The longitudinal edge of the other cover longitudinal portion includes a flap which extends from underneath the edge thereof over the longitudinal leg of the tear pattern and into engagement with the bight of the U shaped return bent terminal flange to conceal the longitudinal leg of the tear pattern. The flap can either be a separate member secured to the longitudinal edge of the other cover portion or an extension of an S shaped return bent terminal flange of such longitudinal edge. The U shaped return bent terminal flange is attached to the upper wall of the container and the flap or the S shaped return bent terminal flange is likewise attached to the upper wall of the container, both being attached adjacent the longitudinal leg of the tear pattern.

The lateral edges of the longitudinal portions of the cover terminate in U shaped return bent terminal flanges which are attached to the upper wall of the container adjacent the lateral legs of the tear pattern.

The cover further includes lateral portions covering the lateral side walls of the container and the portions of the upper wall of the container laterally outwardly of the lateral legs of the tear pattern. The lateral portions of the cover may be integral with the longitudinal portions of the cover or separate therefrom and joined thereto at the corners of the cover assembly. The lateral edges of the lateral portions of the cover include flaps extending from underneath such edges across the lateral legs of the tear line and into engagement with the U shaped return bent terminal flanges of the lateral edges of the longitudinal portions of the cover. The flaps can either be separate members or extensions of S shaped return bent terminal flanges. In either instance, the flaps are attached to the lateral portions of the cover and the container, adjacent the lateral edges of the former and adjacent the lateral legs of the tear pattern of the latter.

When the container ruptures along the tear pattern, the longitudinal portions of the cover open outwardly with the severable sections of the upper wall of the container, with the flaps of the one longitudinal portion and of the lateral portions permitting opening movement of the longitudinal portions of the cover with the severable sections of the container without hindering or impeding such movement.

Since there is no rupture of any part or portion of the cover assembly, the cover assembly can be made of relatively irrupturable material, such as leather. The cover assembly can also be made of rupturable material if so desired. Thus, this invention provides the designer with a much greater latitude in selecting materials from which to manufacture the decorative outer cover assembly of an occupant restraint system.

The primary feature of this invention is that it provides an improved cover assembly for occupant restraint systems which permits the cover to be made from either rupturable or relatively irrupturable materials. Another feature is that the cover assembly covers the tear pattern of the container when the cushion is uninflated and permits inflation of the cushion therethrough without requiring rupture of the cover assembly. A further feature is that the cover assembly includes longitudinal and lateral portions which are secured to the container. Yet another feature is that the cover assembly includes juxtaposed pairs of edges located on opposite sides of the tear pattern of the container and flaps which extend from one edge of each pair and into engagement with the other edge of such pair across the tear pattern of the container to conceal the tear pattern and yet permit separation along such tear pattern without requiring rupture of the cover assembly. Yet a further feature is that the flaps are either separate members extending from underneath the one edges, or extensions of S shaped return bent terminal flanges formed integrally with such edges. Still another feature is that the other edges of the pairs comprise U shaped return bent terminal flanges engaged by the flaps.

These and other features will be readily apparent from the following specification and drawing wherein:

FIG. 1 shows a modular occupant restraint system 20 which is the same as that shown in Clark et al. No. 4,325,568 except for the cover assembly 22 thereof.

Figure 1:
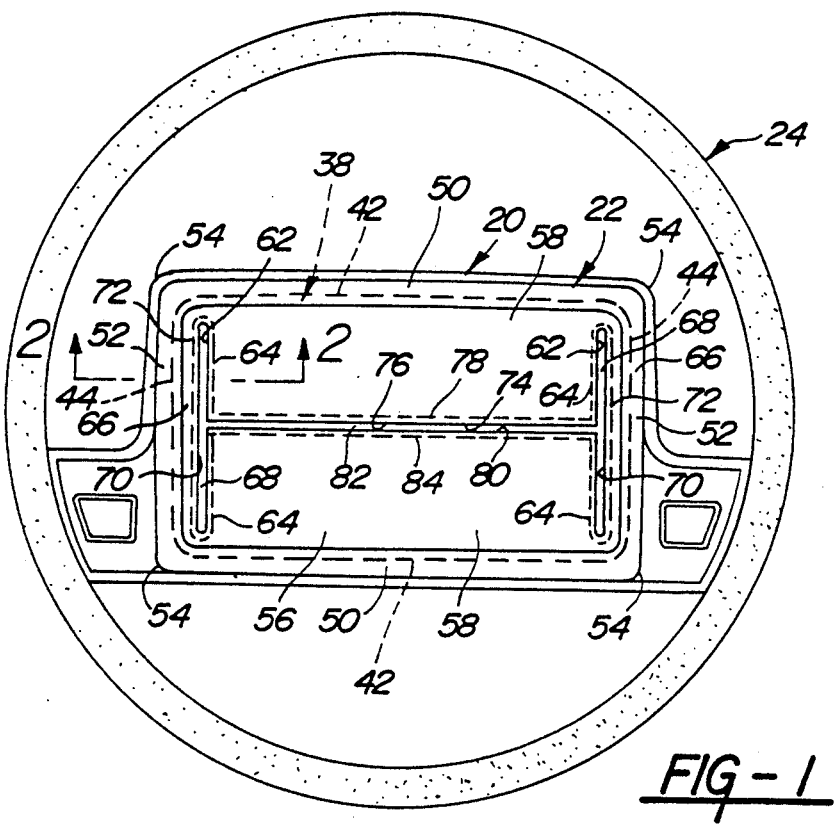
FIG. 1 is a front elevational view of an occupant restraint system embodying a cover assembly according to this invention.

Therefore, only a brief description of the system 20 will be given, and reference may be had to Clark et al. for further details if desired. The system 20 is mounted on the hub portion, not shown, of a vehicle steering wheel 24. The system 20 includes a generally rectangularly shaped support plate 26, the lower side of which seats on and is secured to the hub portion of the steering wheel. The inflator 28 of system 20 has a flange 30 which seats against the lower side of the support plate 26 and is secured thereto around a circular opening 32 thereof. Opening 32 receives the upper outlet portion 34 of inflator 28. The outlet portion 34 fits within the interior of an inflatable occupant restraint cushion 36 having upper and lower circular walls secured together at their edge portions. The lower wall has a central circular opening which receives the outlet portion 34. The cushion is secured to the support plate around the opening thereof and around the opening 32 of the support plate. The cushion 36 is folded in its uninflated condition and seats on the support plate. A box like container 38 overlies and receives the folded cushion 36. The container is formed of molded plastic and includes an upper or base wall 40, longitudinal side walls 42 and lateral side walls 44, all of the walls being integral with each other. The side walls 42 and 44 of the container terminate in lateral flanges which underlie and are secured to the lower side of the support plate 26 adjacent the edges thereof. The upper or base wall 40 of the container is provided with a tear pattern shaped like an H or an I 46, with the lateral legs 48 of this tear pattern being located adjacent the junctures of wall 40 with walls 44 and the longitudinal leg of the tear pattern being located generally parallel to and approximately midway between walls 42.

Figure 2:
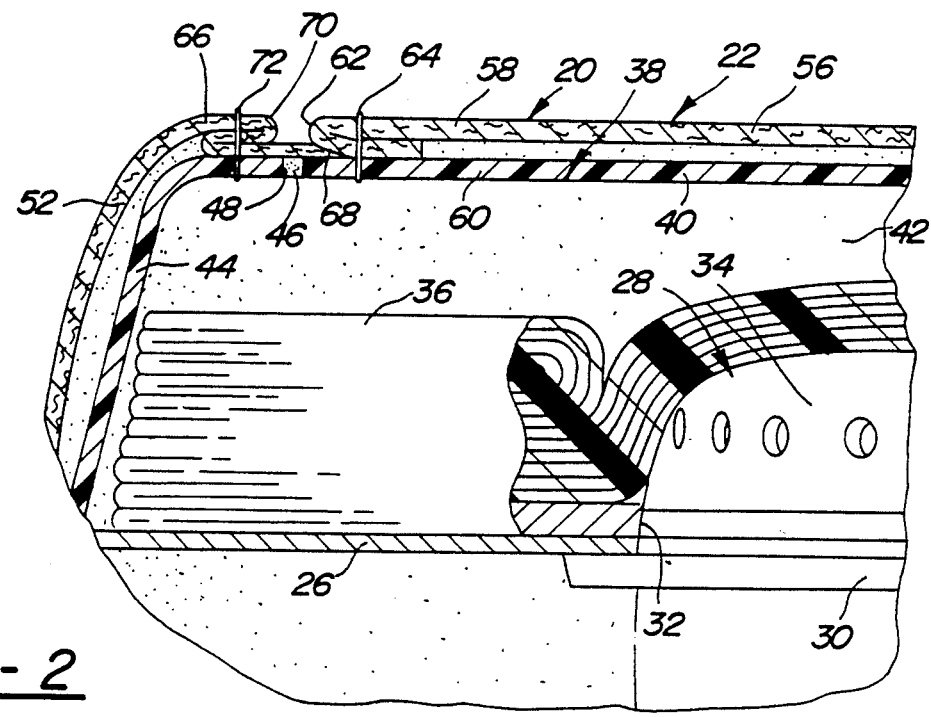
FIG. 2 is an enlarged sectional view taken along line 2—2 of FIG. 1.

The cover assembly 22 is generally coextensive with the container 38 and includes longitudinal side walls 50 and lateral side walls 52 which may be integral with each other, as shown, or which may be separate from each other and fastened together at the corners 54 of the cover assembly. The base or upper wall 56 of the cover assembly includes longitudinal portions 58 which are integral with the longitudinal side walls 50, as shown, or which may be separate therefrom and fastened thereto along the junctures of the longitudinal side walls 50 with wall 56. The longitudinal portions 58 of the cover assembly 22 are generally coextensive with the underlying severable sections 60 of the upper wall 40 of the container 38. The severable sections 60 are each defined by the longitudinal leg and one half of each lateral leg 48 of the tear pattern 46. As shown in FIG. 2, the lateral edges of the longitudinal portions 58 terminate in U shaped return bent terminal flanges 62 which are located laterally inwardly of and immediately adjacent to the lateral legs 48 of the tear pattern 46. The flanges 62 are sewn at 64 to the severable sections 60 of the upper wall 40 of container 38.

The lateral side walls 52 of the cover assembly 22 include integral lateral portions 66 which extend partially over the upper wall 40 of the container 38 and terminate laterally outwardly of and immediately adjacent to the lateral legs 48 of the tear pattern 46 in the upper wall 40 of the container 38. Portions 66 can also be separate from lateral side walls 52 and secured thereto along the junctures of walls 52 and wall 56. A flap 68 extends from underneath the edge of each such lateral portion over a lateral leg 48 and into engagement with the bight of a juxtaposed flange 62. The flap is an extension of an S shaped return bent terminal flange 70 of portion 66 or may be a separate member, not shown. The flange 70 or the separate member is attached at 72 to the upper wall 40 of container 38.

The longitudinal edge 74 of one of the longitudinal portions 58 terminates in a U shaped return bent terminal flange 76, which is the same as the flanges 62, and is sewn to the upper wall 40 of container 38 at 78. The longitudinal edge of the other of the longitudinal portions 58 terminates in an S shaped return bent terminal flange 80, which is the same as flange 70. Flange 80 includes an extension or flap 82 extending over the longitudinal leg of the tear pattern and into engagement with the bight of flange 76. Flap 82 can also be provided by a separate member. Flange 78 or the separate member is attached to the upper wall 40 of container 38 at 84.

Upon rupture of wall 40 by the cushion 36 upon inflation thereof, the severable sections 60 open outwardly and oppositely of each other about hinge lines generally at the junctures of walls 42 with each such section. Since the longitudinal cover portions 58 are sewn to the severable sections 60 adjacent the lateral legs 48 and longitudinal leg of the tear pattern 46, they open with such sections. The flaps 68 and 82 permit this opening movement of longitudinal cover portions 58 without hindrance or impedance since there is no rupture of any part of the upper wall 56 of the cover assembly.

If desired, the flaps 68 can be provided on the lateral edges of the longitudinal portions 58 and the U shaped terminal flanges 62 provided on the edges of the lateral portions 66 of the cover assembly. It will also be understood that the S shaped return bent terminal flanges 70 and 80 are provided in reduced thickness or skived edge portions of the cover assembly. Although the cover assembly has been shown and described as being formed of leather, it can be formed of other relatively irrupturable materials and can also be formed of rupturable materials if so desired.

Thus, this invention provides an improved cover assembly for occupant restraint systems which does not require rupture thereof in order for an inflated occupant restraint cushion to pass therethrough.

The embodiments of the invention in which an exclusive property or privilege is claimed are defined as follows:

1. In an occupant restraint system having a generally box like container housing an inflatable cushion and including an upper wall provided with a tear pattern having a longitudinal leg and lateral legs which define first and second severable wall sections, the common edges of the wall sections being provided by the longitudinal leg of the tear pattern and the side edges of the wall sections being provided by the lateral legs of the tear pattern, the wall sections opening outwardly and oppositely of each other about hinge lines spaced from the common edges thereof upon inflation of the cushion and rupture of the upper wall along the tear pattern, a decorative cover assembly covering the container wall and including first and second cover portions, each generally coextensive with a respective container wall section, and side portions located to the sides of the first and second cover portions, the longitudinal edges of the first and second cover portions being spaced from each other across the longitudinal leg of the tear pattern and the lateral edges of the first and second cover portions being spaced from the side portions of the cover across the lateral legs of the tear pattern, first flap means extending from a longitudinal edge of one of the cover portions across the longitudinal leg of the tear pattern and into engagement with the common edge of the other cover portion, and second flap means extending from the side portions of the cover across the lateral legs of the tear pattern and into engagement with the lateral edges of the first and second cover portions, the first and second flap means providing decorative concealment of the tear pattern when the cushion is not inflated.

2. In an occupant restraint system having a generally box like container housing an inflatable cushion and including an upper wall provided with a tear pattern having a longitudinal leg and lateral legs which define first and second severable wall sections, the common edges of the wall sections being provided by the longitudinal leg of the tear pattern and the side edges of the wall sections being provided by the lateral legs of the tear pattern, the wall sections opening outwardly and oppositely of each other about hinge lines spaced from the common edges thereof upon inflation of the cushion and rupture of the upper wall along the tear pattern, a decorative cover assembly covering the container wall and including first and second cover portions, each generally coextensive with a respective container wall section, and side portions located to the sides of the first and second cover portions, the longitudinal edges of the first and second cover portions being spaced from each other across the longitudinal leg of the tear pattern and the lateral edges of the first and second cover portions being spaced from the side portions of the cover across the lateral legs of the tear pattern, return bent flange means along the longitudinal edge of one of the cover portions, first flap means extending from the longitudinal edge of the other cover portion across the longitudinal leg of the tear pattern and into engagement with the return bent flange means, second return bent flange means along the side edges of the first and second cover portions, and second flap means extending from the side portions of the cover across the legs of the tear pattern and into engagement with the second return bent flange means, the first and second flap means providing decorative concealment of the tear pattern when the cushion is not inflated.

3. In an occupant restraint system having a generally box like container housing an inflatable cushion and including an upper wall provided with a tear pattern having a longitudinal leg and lateral legs which define first and second severable wall sections, the common edges of the wall sections being provided by the longitudinal leg of the tear pattern and the side edges of the wall sections being provided by the lateral legs of the tear pattern, the wall sections opening outwardly and oppositely of each other about hinge lines spaced from the common edges thereof upon inflation of the cushion and rupture of the upper wall along the tear pattern, a decorative cover assembly covering the container wall and including first and second cover portions, each generally coextensive with a respective container wall section, and side portions located to the sides of the first and second cover portions, the longitudinal edges of the first and second cover portions being spaced from each other across the longitudinal leg of the tear pattern and the lateral edges of the first and second cover portions being spaced from the side portions of the cover across the lateral legs of the tear pattern, U shaped return bent flange means along the longitudinal edge of one of the cover portions, first flap means extending from underneath the longitudinal edge of the other cover portion across the longitudinal leg of the tear pattern and into engagement with the U shaped return bent flange means, second U shaped return bent flange means along the lateral edges of the first and second cover portions, and second flap means extending from underneath the side portions of the cover across the lateral legs of the tear pattern and into engagement with the second U shaped return bent flange means, the first and second flap means providing decorative concealment of the tear pattern when the cushion is not inflated.

4. In an occupant restraint system having a generally box like container housing an inflatable cushion and including an upper wall provided with a tear pattern having a longitudinal leg and lateral legs which define first and second severable wall sections, the common edges of the wall sections being provided by the longitudinal leg of the tear pattern and the side edges of the wall sections being provided by the lateral legs of the tear pattern, the wall sections opening outwardly and oppositely of each other about hinge liens spaced from the common edges thereof upon inflation of the cushion and rupture of the upper wall along the tear pattern, a decorative cover assembly covering the container wall and including first and second cover portions, each generally coextensive with a respective container wall section, and side portions located to the sides of the first and second cover portions, the longitudinal edges of the first and second cover portions being spaced from each other across the longitudinal leg of the tear pattern and the lateral edges of the first and second cover portions being spaced from the side portions of the cover across the lateral legs of the tear pattern, U shaped return bent flange means along the longitudinal edge of one of the cover portions, first flap means extending from underneath the longitudinal edge of the other cover portion across the longitudinal leg of the tear pattern and into engagement with the U shaped return bent flange means, second U shaped return bent flange means along the lateral edges of the first and second cover portions, and second flap means extending from underneath the side portions of the cover across the lateral legs of the tear pattern and into engagement with the second U shaped return bent flange means, the first and second flap means providing decorative concealment of the tear pattern when the cushion is not inflated, and means securing the U shaped flange means to the first and second wall sections of the container.

5. In an occupant restraint system having a generally box like container housing an inflatable cushion and including an upper wall provided with a tear pattern having a longitudinal leg and lateral legs which define first and second severable wall sections, the common edges of the wall sections being provided by the longitudinal leg of the tear pattern and the side edges of the wall sections being provided by the lateral legs of the tear pattern, the wall sections opening outwardly and oppositely of each other about hinge lines spaced from the common edges thereof upon inflation of the cushion and rupture of the upper wall along the tear pattern, a decorative cover assembly covering the container wall and including first and second cover portions, each generally coextensive with a respective container wall section, and side portions located to the sides of the first and second cover portions, the longitudinal edges of the first and second cover portions being spaced from each other across the longitudinal leg of the tear pattern and the lateral edges of the first and second cover portions being spaced from the side portions of the cover across the lateral legs of the tear pattern, U shaped return bent flange means along the longitudinal edge of one of the cover portions, S shaped return bent flange means along the longitudinal edge of the other cover portion and having an extension extending across the longitudinal leg of the tear pattern and into engagement with the U shaped flange means, second U shaped return bent flange means along the lateral edges of the first and second cover portions, and S shaped return bent flange means along the lateral edges of the side portions of the cover and having extensions extending across the lateral legs of the tear pattern and into engagement with the second U shaped flange means, the first and second extensions providing decorative concealment of the tear pattern when the cushion is not inflated.

6. In an occupant restraint system having a generally box like container housing an inflatable cushion and including an upper wall provided with a tear pattern having a longitudinal leg and lateral legs which define first and second severable wall sections, the common edges of the wall sections being provided by the longitudinal leg of the tear pattern and the side edges of the wall sections being provided by the lateral legs of the tear pattern, the wall sections opening outwardly and oppositely of each other about hinge lines spaced from the common edges thereof upon inflation of the cushion and rupture of the upper wall along the tear pattern, a decorative cover assembly covering the container wall and including first and second cover portions, each generally coextensive with a respective container wall section, and side portions located to the sides of the first and second cover portions, the longitudinal edges of the first and second cover portions being spaced from each other across the longitudinal leg of the tear pattern and the lateral edges of the first and second cover portions being spaced from the side portions of the cover across the lateral legs of the tear pattern, U shaped return bent flange means along the longitudinal edge of one of the cover portions, S shaped return bent flange means along the longitudinal edge of the other cover portion and having an extension extending across the longitudinal leg of the tear pattern and into engagement with the U shaped flange means, second U shaped return bent flange means along the lateral edges of the first and second cover portions, and S shaped return bent flange means along the lateral edges of the side portions of the cover and having extensions extending across the lateral legs of the tear pattern and into engagement with the second U shaped flange means, the first and second extensions providing decorative concealment of the tear pattern when the cushion is not inflated, the U shaped and S shaped flange means being attached to the upper wall of the container.

* * * * *